No. 846,193. PATENTED MAR. 5, 1907.
J. FELLOWS.
CENTRIFUGAL CLUTCH.
APPLICATION FILED FEB. 15, 1904.

2 SHEETS—SHEET 1.

Witnesses:
Wesley H. Reel.
Titus H. Ivins.

Inventor:
Joseph Fellows,
by his Attorneys,
Howson & Howson

No. 846,193. PATENTED MAR. 5, 1907.
J. FELLOWS.
CENTRIFUGAL CLUTCH.
APPLICATION FILED FEB. 15, 1904.
2 SHEETS—SHEET 2.
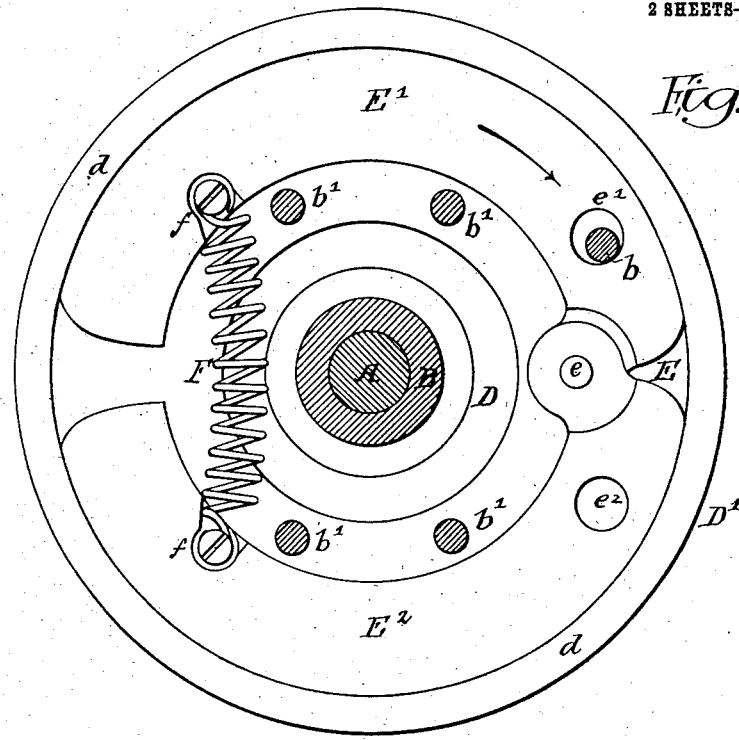
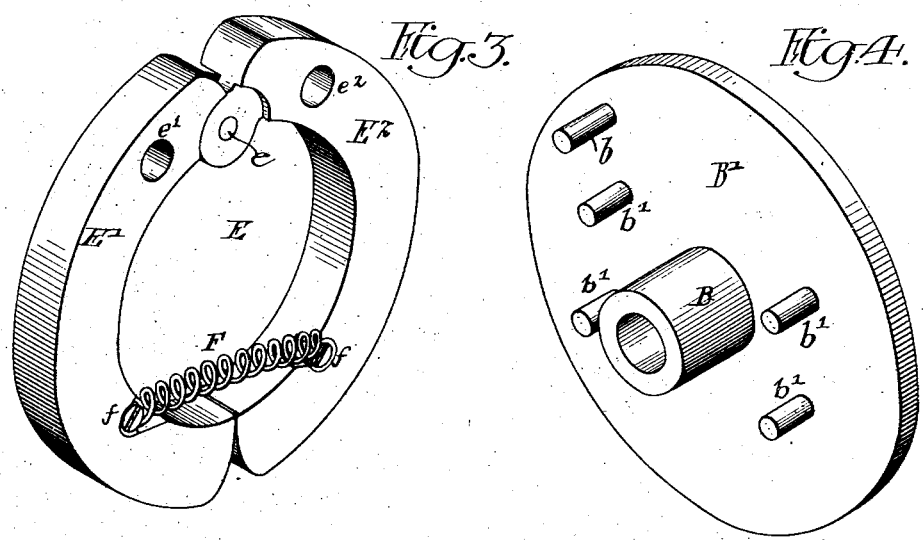
Witnesses:
Wesley A. Reel
Titus H. Irons
Inventor:
Joseph Fellows,
by his Attorneys,
Howson & Howson

UNITED STATES PATENT OFFICE.

JOSEPH FELLOWS, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

CENTRIFUGAL CLUTCH.

No. 846,193.  Specification of Letters Patent.  Patented March 5, 1907.

Application filed February 15, 1904. Serial No. 193,842.

*To all whom it may concern:*

Be it known that I, JOSEPH FELLOWS, a citizen of the United States, residing in Philadelphia, Pennsylvania, have invented certain Improvements in Centrifugal Clutches, of which the following is a specification.

The object of my invention is to so construct the clutch that the driven element will not be engaged until the driving element has attained a certain speed.

My invention is especially applicable in coupling a single-phase alternating-current motor with any machine to which power is to be applied. This object I attain in the following manner, reference being had to the accompanying drawings, in which—

Figure 1:
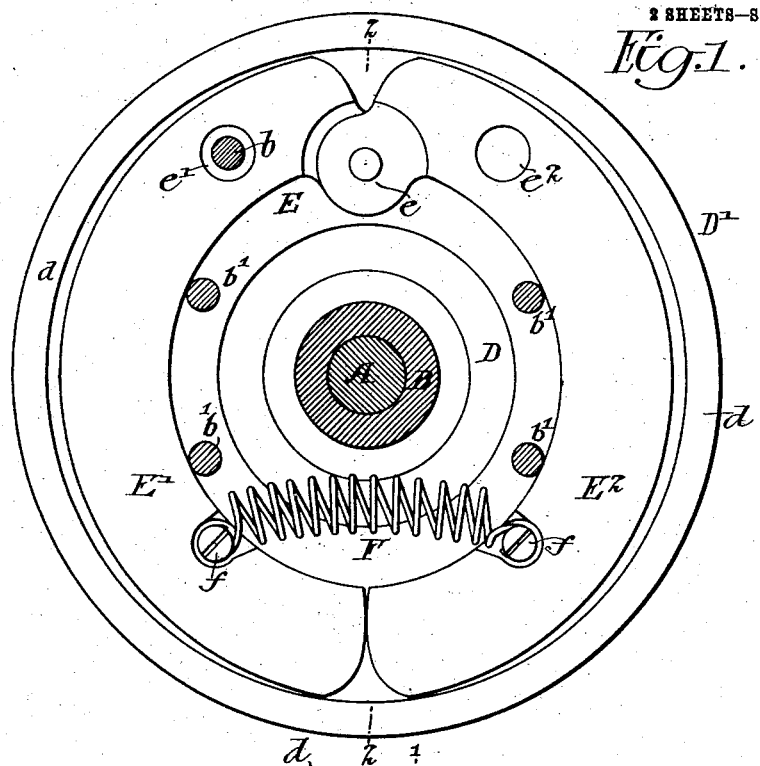
Figure 2:
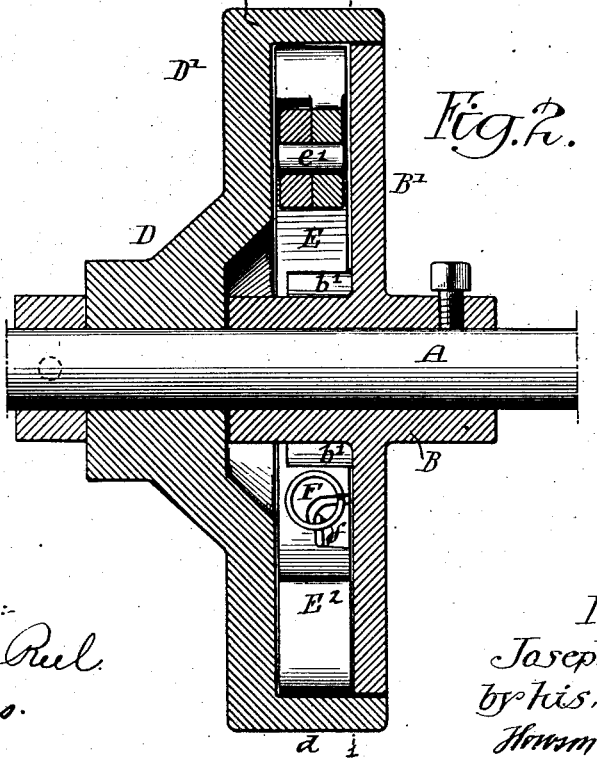

Figure 1 is a sectional view on the line 1 1, Fig. 2, with the casing in outside view. Fig. 2 is a transverse section on the line 2 2, Fig. 1. Fig. 3 is a perspective view of the expanding element. Fig. 4 is a perspective view of the disk secured to the driving element, and Fig. 5 is a view showing the action when the clutch is driven.

In the present instance, A is a driving-shaft, to which is secured a hub B, having a disk B'. D is a hub loose on the shaft A and having a shell D', on which is a rim $d$, inclosing the clutch mechanism.

E is the clutch element, consisting of two segmental arms E' E², the arms being pivoted together at $e$, so that they can swing out against the rim $d$ of the shell D'. Extending from one segmental arm to the other is a spring F, coupled at $ff$ to said arms in any suitable manner. This spring acts against centrifugal force to draw the arms together and away from the shell, and the tension of this spring can be modified as desired to quicken or retard the clutching action. In each arm in the present instance are two openings $e'$ $e^2$ for the reception of a pin $b$, projecting from the inner surface of the disk B'. When it is wished to rotate the clutch element in the direction of the arrow, Fig. 5, then the pin is placed in the opening $e'$ of the arm E'; but when the element is to be rotated in the opposite direction then the pin is placed in the opening $e^2$ of the arm E², as the movement is preferably toward the pivot-pin $e$. In the present instance the openings $e'$ and $e^2$ are much larger than the pin $b$, so as to allow the arms to have free movement to seat themselves against the inner surface of the flange.

$b'$ $b'$ are pins on the disk B', four in the present instance, which limit the inward movement of the arms E' and E², keeping the clutch element in a central position and preventing it from rattling. A flange may project from the disk B' as a substitute for the pins in some instances.

My invention is especially applicable for coupling driving and driven elements in which the driven element should not be coupled to the driving element until the driving element has attained a certain speed—such, for instance, as a single-phase alternating-current motor.

By the use of such a coupling as described I can rotate the shaft A and its disk B' freely without the arms being thrown into engagement with the driven disk D' until the motor has attained its full speed, when the arms will be thrown out by centrifugal force to the full extent, as shown in Fig. 5, and will put sufficient pressure upon the flange of the shell that the shell will turn with the disk and its shaft; but as soon as the speed is reduced the clutch mechanism will release itself from the disk.

I claim as my invention—

1. The combination in a centrifugal clutch, of a driving element and a flanged driven element, a clutch element consisting of two arms, one of said arms being pivoted to the driving element and the other arm being free of the said driving element, substantially as described.

2. The combination in a centrifugal clutch, of a driving element and a flanged driven element, a pin on the driving element, a clutch element consisting of two arms pivoted together, an opening in one of said arms at a point at one side of the pivot through which extends the pin of the driving element, substantially as described.

3. The combination in a centrifugal clutch, of a driving element having a pin projecting from its inner surface, a flanged driven element, a clutch element consisting of two arms pivoted together, and a spring for retracting said arms, each arm having an opening at one side of the pivot-point for the reception of the driving-pin, substantially as described.

4. The combination of a shaft, a driven shell and a driving-disk mounted on the shaft, a flange on the shell, two arms loosely mounted within the shell pivoted together at one end, a spring connecting the free ends of the arms together, an opening in each arm near the pivot, and a pin on the driving-disk extending into one of the openings in the arms, substantially as described.

5. The combination of a driving element and a driven element, clutch mechanism consisting of two arms pivoted together and pivoted to the driving element, means for drawing the arms together and stops to limit the inward movement of the arms, substantially as described.

6. The combination of a driving-disk, a pin thereon, clutch mechanism hung on said pin and consisting of two arms pivoted together, a spring coupled to each arm, stop-pins projecting from the driving-disk acting to limit the inward movement of the arms, substantially as described.

In testimony whereof I have signed my name to this specification in the presence of two subscribing witnesses.

JOSEPH FELLOWS.

Witnesses:
CHARLES C. NORRIS, Jr.,
WILL. A. BARR.